J. E. BECKMAN.
POWER TRANSMISSION MECHANISM.
APPLICATION FILED AUG. 22, 1910.

998,831.

Patented July 25, 1911.

4 SHEETS—SHEET 1.

Witnesses
Martin H. Olsen
Edwin Phelps

Inventor
John E. Beckman
By Rummler & Rummler
Att'ys

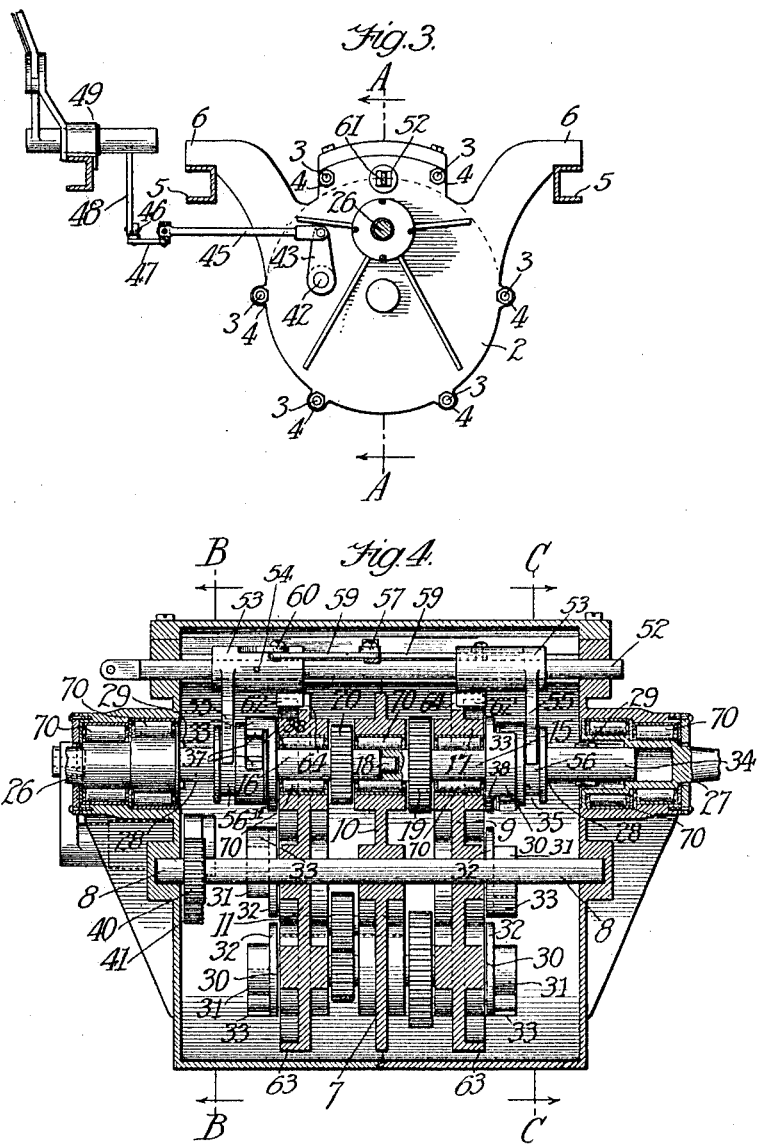

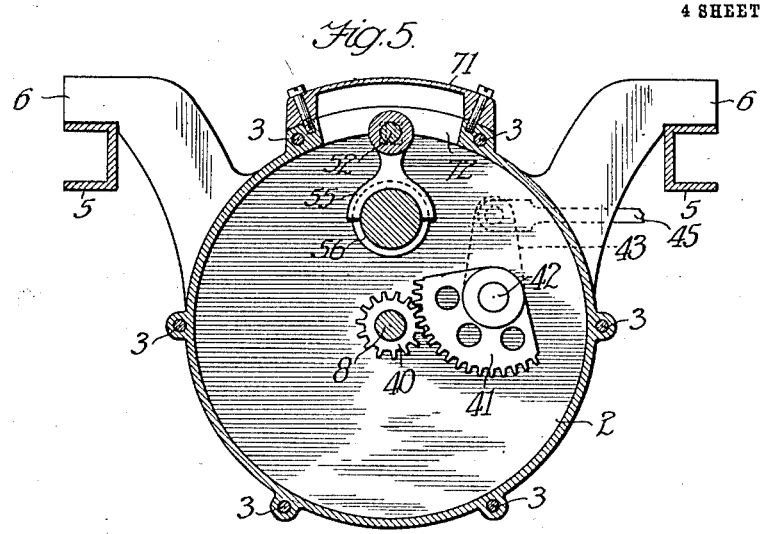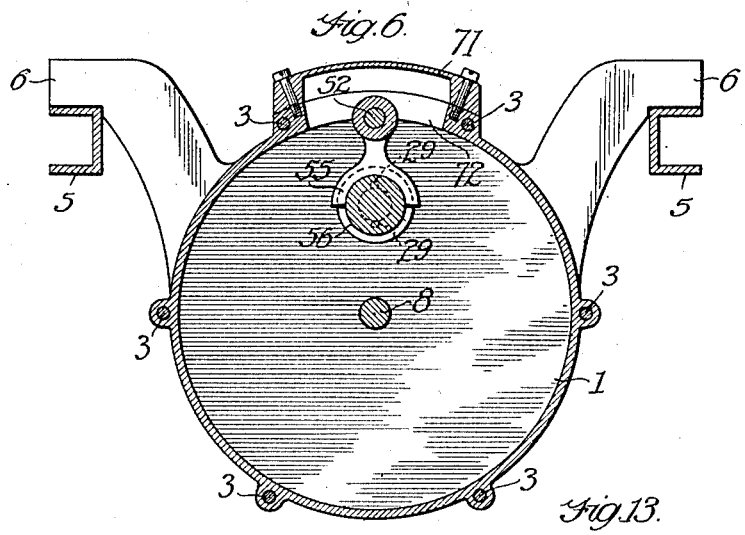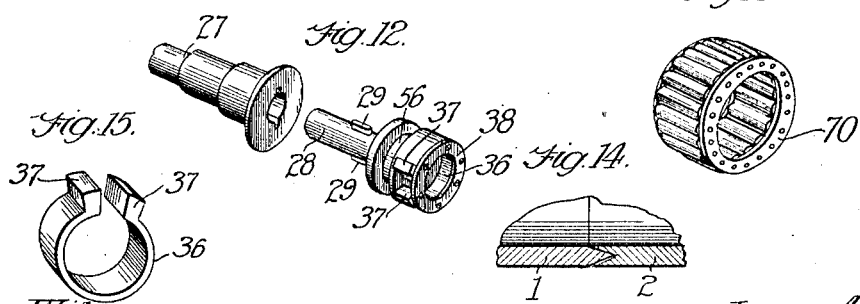

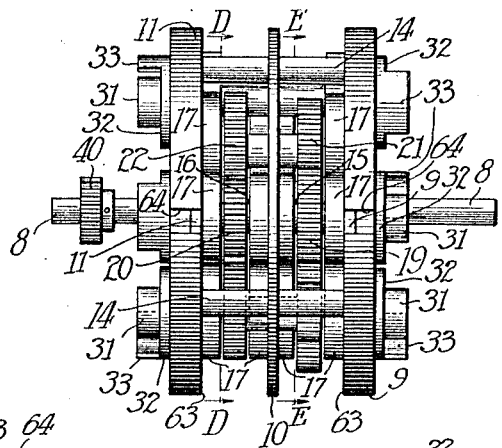
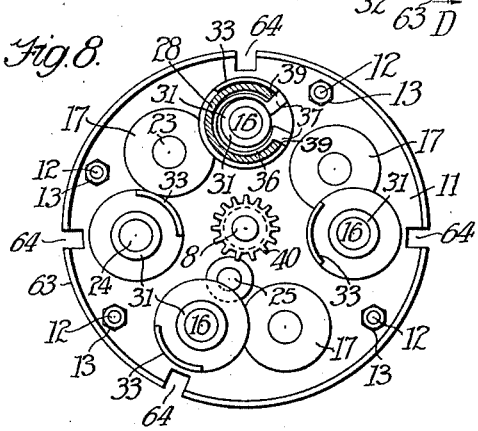
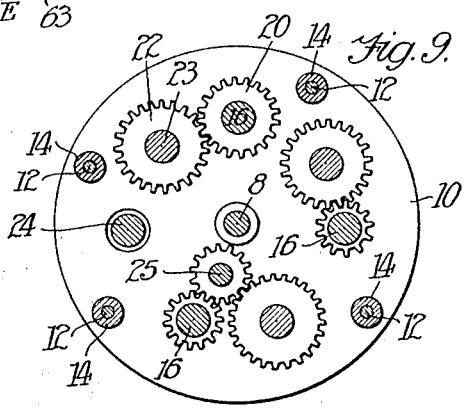
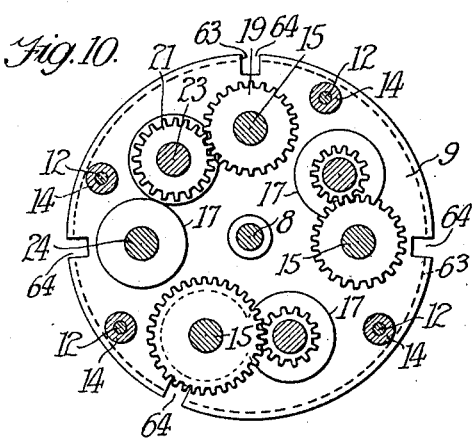
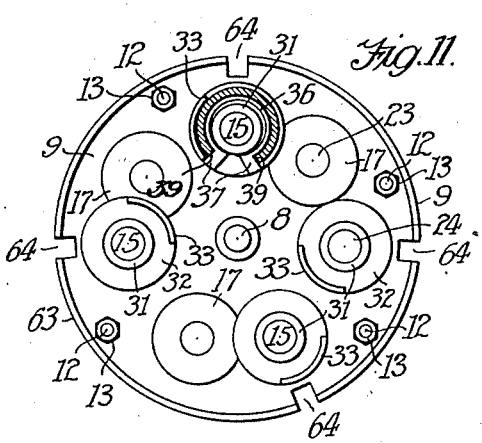

UNITED STATES PATENT OFFICE.

JOHN E. BECKMAN, OF CHICAGO, ILLINOIS.

POWER-TRANSMISSION MECHANISM.

998,831.  Specification of Letters Patent.  Patented July 25, 1911.

Application filed August 22, 1910. Serial No. 578,317.

*To all whom it may concern:*

Be it known that I, JOHN E. BECKMAN, a citizen of the United States of America, and a resident of Chicago, county of Cook, State of Illinois, have invented certain new and useful Improvements in Power-Transmission Mechanisms, of which the following is a specification.

The main objects of this invention are to provide an improved form of power transmission mechanism whereby the necessity of shifting gears into and out of mesh with each other is avoided, and whereby the changing of speeds is accomplished by the shifting of different gear trains bodily into and out of operative position; and to provide improved mechanism for shifting different gear trains into operative position, and for connecting and disconnecting them from the driving and driven elements.

An illustrative embodiment of this invention is shown in the accompanying drawing, in which:—

Figure 1:
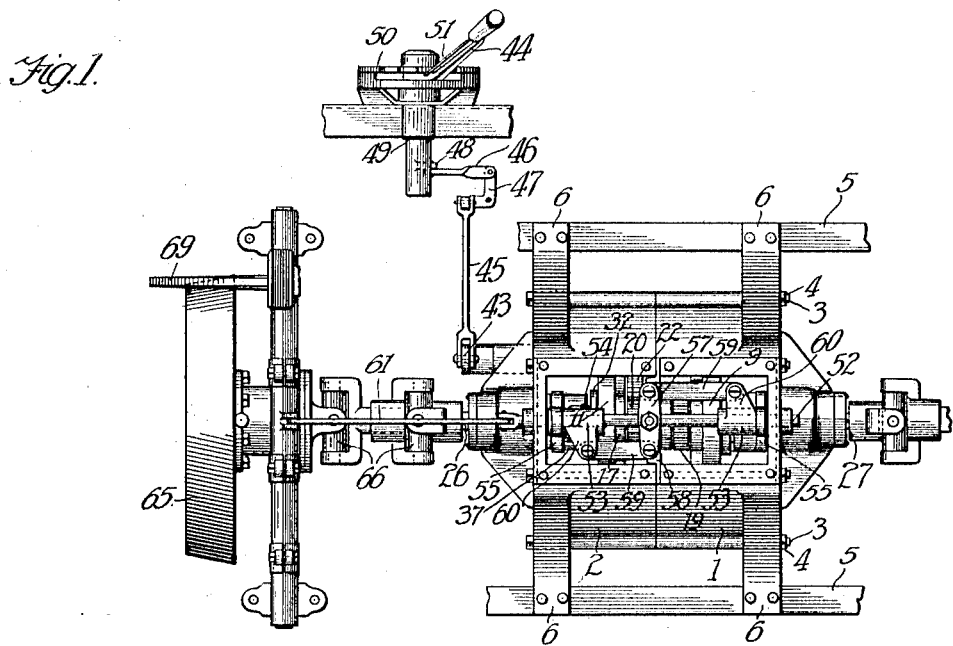
Figure 2:
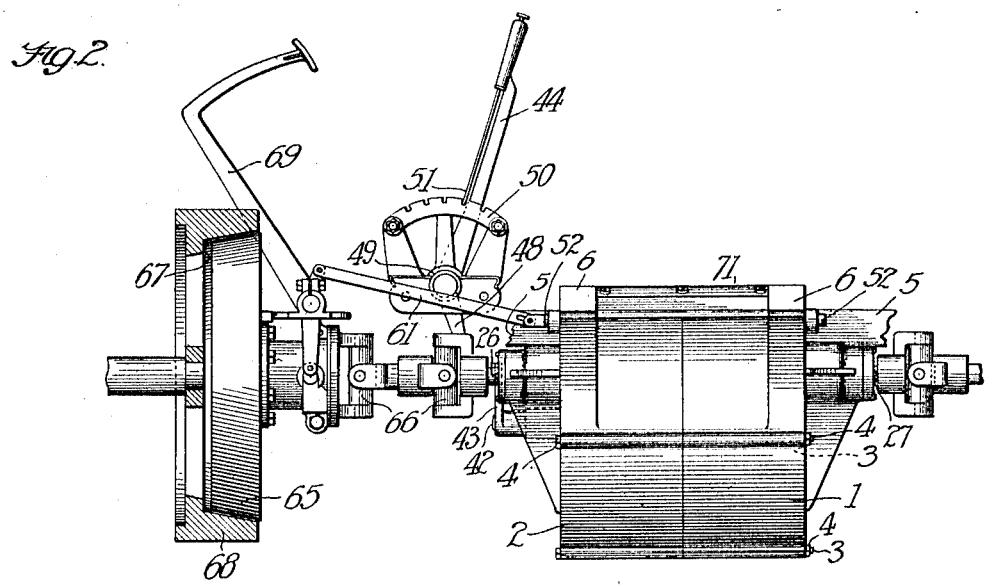

Figure 1 is a plan view of a power transmission mechanism constructed according to this invention and of a form suitable for use in motor vehicles. Fig. 2 is a side elevation of the same. Fig. 3 is an end elevation of the same. Fig. 4 is an enlarged, sectional elevation taken on the line A—A of Fig. 3. Figs. 5 and 6 are enlarged transverse sectional elevations taken respectively on the lines B—B and C—C of Fig. 4. Fig. 7 is an elevation of the speed changing mechanism removed from its casing. Fig. 8 is a left end elevation of the same. Figs. 9 and 10 are sectional details, taken respectively on the lines D—D and E—E of Fig. 7. Fig. 11 is a right end elevation of the parts shown in Fig. 7. Fig. 12 is a detail in perspective of part of the clutch mechanism. Fig. 13 is a detail in perspective of the roller bearings. Fig. 14 is a fragmentary sectional detail of the joint between the casing sections. Fig. 15 is a detail in perspective of the shock absorbing element of the clutches.

The device shown in the drawings comprises, in general, a plurality of gear trains angularly spaced about an axis about which they may be rotated by suitable mechanism to bring different gear trains into position for operative connection with the driving and driven elements. The driving connection between the gear trains and the driving and driven elements is made by suitable clutch mechanism. All of the gearing is housed within an oil tight casing. The casing, in the form shown, is formed of two sections 1 and 2 which have their abutting edges dovetailed to have wedging fit and to form an oil tight joint when forced together by the bolts 3 and nuts 4. The casing is suspended from the vehicle frame 5 by the outwardly and upwardly disposed arms 6.

The speed gear trains are arranged about the axis of the rotatable supporting member 7, which is fixed on an arbor 8 journaled in the casing. The supporting member 7 comprises three plates 9, 10 and 11, which are secured together by bolts 12 and nuts 13. Tubes 14, placed over the bolts 12, space the plates apart. In the form shown, provision is made for three speeds forward and the one speed reverse, and for each speed except the high speed, there is a pair of shafts 15 and 16 journaled in axial alinement in the hubs 17 formed on the plates 9, 10 and 11, and having their inner ends telescoping at 18 (Fig. 4). Gears 19 and 20 on the shafts 15 and 16 respectively, mesh with gears 21 and 22 on the shaft 23 which is journaled in the plates 9 and 11. The high speed gear comprises simply a shaft 24 to which the driving and driven elements are directly connected. The reverse gear train includes an extra pinion 25 journaled between the plates 10 and 11 and meshing with the gears 20 and 22.

The clutch mechanism, which connects the driving element 26 and the driven element 27 with either of the gear trains, comprises shiftable clutch members 28 carried in the adjacent ends of the driving and driven elements, each being splined to its respective element by a feather 29. The members 28 are shiftable toward each other so as to be brought into engagement with the coacting clutch members 30 fixed on the outer ends of the shafts 15, 16 and 24. Each clutch member 30 comprises a hub 31 having a transverse annular flange and a projecting shoulder 33 at the edge thereof and spaced away from the hub 31. Each clutch member 28 comprises a shaft 34 which carries the key 29, and which has integrally formed on the end an enlarged hollow cylindrical part 35. A split ring 36, formed of spring material and having its ends terminating in the outwardly disposed shoulders 37, is retained within the enlarged part 35 by means of the ring 38 secured by suitable screws. The shoulders 37 project outward from the periphery of the part 35 through an opening formed therein, and abut against the shoulders 39 (see Figs. 8 and 11) to secure the ring 36 against relative rotation. The hub 31 and the ring 36 have telescoping engagement when the clutch member 28 is engaged with one of the clutch members 30. When the clutch members are thus engaged, the driving strain is carried from one of the shoulders 39 to the adjacent shoulder 37 of the ring 36, and then from the other shoulder 37 on the ring to the shoulder 33 of the other clutch member. This relative rotation of the two clutch members is first yieldingly resisted by the spring ring 36 which, after becoming closely wrapped around the periphery of the hub 31, can yield no further, and thus forms a positive connection between the two clutch members. This arrangement causes an even distribution of the strain, and absorbs the shock upon the parts so that it is particularly advantageous in a device of this kind where one of the clutch members is likely to be rotating at a high speed when the other is thrown into engagement with it. The invention embodied in this clutch mechanism, just described, is not broadly claimed, but is made the subject matter of a copending application, Serial No. 578,700, filed August 24th, 1910, and allowed October 10th, 1910.

The speed changing mechanism comprises the pinion 40 fixed on the arbor 8, and in mesh with the gear sector 41 fixed on the shaft 42 which is journaled in the casing section 2. An arm 43 is arranged to rock the shaft 42 and is connected to the operating lever 44 through the medium of links 45 and 46 connected to the bell crank lever 47, the link 46 being connected to an arm 48 rotatable with the shaft 49, to which the lever 44 is secured. A notched sector 50 coacts with the detent 51 on the lever 44 to secure said lever in different positions corresponding to different speeds.

The clutch shifting mechanism comprises a rod or shaft 52 slidably mounted in the casing above the bearings of the driving and driven elements, and has mounted thereon a pair of sleeves 53, one being fixed by the pin 54 and the other being free to slide on the shaft 52. Each sleeve 53 has a depending integral fork 55 which engages with an annular groove 56 in the part 35 of the corresponding clutch member 28. An arm 57, pivotally mounted on the member 58, which is supported on the casing and held in place by the two adjacent bolts 3, is connected by links 59 to lugs 60 integral with the sleeves 53. Through this system of links and sleeves 53, simultaneous operation of the clutches at both ends of the gear trains is effected. The end of the rod 52, as shown in the drawings, is directly connected by the link 61 with the operating mechanism of the main driving clutch, but might be connected to a separate operating lever. If directly connected, it is preferable to provide for lost motion in one of the joints, so that the main clutch may be opened without necessarily opening the speed gear clutches. This is accomplished by providing an elongated hole at one end of the link 61.

In order to prevent the clutch members 28 from being shifted to their closed position while the gear trains are in neutral positions, the sleeves 53 are provided with lugs 62 adapted to coact with the edge of the outwardly projecting flanges 63 on the plates 9 and 11. The flanges are recessed at 64 to receive the lugs 62 when the supporting member 7 is in such position that either of the speed gear trains registers with the driving and driven shafts.

The main driving clutch shown in the drawings represents a usual form of friction clutch and comprises a conical friction disk 65 connected by knuckle joints 66 to the shaft 26 and normally urged by a suitable spring (not shown) into engagement with the friction surface 67 formed on the fly wheel 68. In the drawings, a foot lever 69 is shown connected to the clutch 65, whereby it is adapted to be thrown out of engagement with the fly wheel 68, and to this foot lever mechanism the link 61 is connected so as to permit the speed clutch mechanism to be operated simultaneously with the friction clutch.

All of the rotating power transmitting shafts are journaled in roller bearings 70. A cover 71 is secured to the casing over the opening 72.

The operation of the device shown is as follows:—By virtue of the connection between the main driving clutch and the operating mechanism of the speed clutches, all of said clutches are normally urged to their closed position by the spring which closes the main driving clutch. By depressing the foot lever 69, the operator may open the main driving clutch, thus disconnecting the transmission mechanism from the engine. If the foot lever is shifted only a short distance, the speed clutches will be unaffected on account of the lost motion in the link 61, but if the foot lever 69 is pushed forward to the limit of its movement, the clutch members 28 will be simultaneously thrown back to their disengaged position, and will allow the supporting member 7 to be rotated so as to bring the mechanism corresponding to any desired speed into its operative position. This movement of the member 7 is accomplished by shifting the lever 44. When the member 7 is in any position except the operative position for one of the speed gear trains, the lugs 62 will engage the flanges 63 and hold the clutch members 28 retracted, even though the foot lever may be released. Thus, the release of the foot lever will not interfere with the shifting of the member 7 so as to bring one of the speed gear trains into proper position for connection with the driving and driven elements. It is better, however, for the operator to hold the foot lever depressed until he has brought the proper speed gear train into operative position, and then upon releasing the foot lever, the clutches will automatically close.

Although but one specific embodiment of this invention is herein shown and described, it will be understood that numerous details of the construction shown may be altered or omitted without departing from the spirit of this invention as defined by the following claims.

I claim:—

1. In a power transmission mechanism, the combination of driving and driven elements, a plurality of different speed gear trains angularly spaced about an axis and each adapted to connect said driving and driven elements, a supporting member carrying said gear trains and journaled to rotate on said axis, a pinion mounted to rotate said member, a gear sector in mesh with said pinion, an operating lever operatively connected with said sector, whereby said supporting member may be shifted to bring different gear trains into position to connect said driving and driven elements, and clutch mechanism for connecting said gear trains with said driving and driven elements.

2. In a power transmission mechanism, the combination of driving and driven elements, a plurality of different speed gear trains for connecting said driving and driven elements, a shiftable supporting member for said gear trains, means for shifting said supporting member to bring different gear trains into position to connect said driving and driven elements, clutch mechanism for connecting said gear trains with said driving and driven elements, and means for operating said clutch mechanism, said clutch operating means and said supporting member having shoulders adapted to coact to prevent the operation of said clutch mechanism except when one of said gear trains is in position to be connected with said driving and driven elements.

3. In a power transmission mechanism, the combination of driving and driven elements, a plurality of different speed gear trains for connecting said driving and driven elements, a shiftable supporting member for said gear trains, said member having outwardly disposed flanges, means for shifting said supporting member to bring different gear trains into position to connect said driving and driven elements, clutch mechanism for connecting said gear trains with said driving and driven elements, clutch shifting members, each having a shoulder adapted to coact with one of said flanges to hold said clutch mechanism out of engagement, said flanges having recesses adjacent to each of said gear trains and adapted to permit the entrance of said shoulders to allow the shifting of said clutch members into interlocking engagement.

4. In a power transmission mechanism, the combination of driving and driven elements, a plurality of different speed gear trains arranged about an axis and adapted to connect said driving and driven elements, a supporting member for said gear trains having outwardly disposed annular flanges thereon, said flanges having recesses adjacent to each of said gear trains, means for rotating said supporting member to bring different gear trains into position to connect said driving and driven elements, clutch members rotatable with each of said gear trains, shiftable clutch members rotatable with said driving and driven elements, clutch shifting means movably mounted adjacent to each of said shiftable clutch members and having a part extending into engagement therewith, and shoulders on said clutch shifting means adapted to engage said flanges and prevent the interlocking engagement of said clutch members, except when opposed to said recesses.

5. The combination of driving and driven elements, a plurality of different speed gear trains for connecting said driving and driven elements, a shiftable supporting member for said gear trains, means for shifting said supporting member to bring different gear trains into position to connect said driving and driven elements, clutch mechanism for connecting said gear trains with said driving and driven elements, a driving clutch interposed between said driving and driven elements and said gear trains, and means for operating said driving clutch and said clutch operating means simultaneously.

6. In a power transmission mechanism, the combination of driving and driven elements, a plurality of different speed gear trains for connecting said driving and driven elements, a shiftable supporting member for said gear trains, and means for shifting said supporting member to bring different gear trains into position to connect said driving and driven elements, speed gear clutches for connecting said gear trains with said driving and driven elements, a main driving clutch, operating mechanism for said main driving clutch, and a connection between said gear clutches and the operating mechanism of said main clutch whereby said main clutch and said gear clutches can be moved simultaneously, said connection having a joint which has enough lost motion to allow opening of the main clutch without necessarily opening the speed gear clutches.

7. The combination of driving and driven elements, a plurality of different speed gear trains for connecting said driving and driven elements, a rotatable supporting member for said gear trains, a gear mounted to rotate with said supporting member, means engaging said gear and movable to shift said supporting member and thereby bring different gear trains into position to connect said driving and driven elements, and clutch mechanism for connecting said gear trains with said driving and driven elements.

Signed at Chicago this 13th day of August 1910.

JOHN E. BECKMAN.

Witnesses:
EUGENE A. RUMMLER,
EDWIN PHELPS.

---

Copies of this patent may be obtained for five cents each, by addressing the "Commissioner of Patents, Washington, D. C."